(12) United States Patent
Chennakeshu et al.

(10) Patent No.: US 10,551,407 B2
(45) Date of Patent: Feb. 4, 2020

(54) DETERMINING AN OPEN/CLOSE STATUS OF A BARRIER

(71) Applicant: BlackBerry Limited, Waterloo (CA)

(72) Inventors: Sandeep Chennakeshu, Austin, TX (US); Dake He, Waterloo (CA); Yu Gao, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 492 days.

(21) Appl. No.: 15/223,693

(22) Filed: Jul. 29, 2016

(65) Prior Publication Data

US 2018/0031604 A1  Feb. 1, 2018

(51) Int. Cl.
*G01P 15/14* (2013.01)
*G01C 9/02* (2006.01)

(52) U.S. Cl.
CPC .............. *G01P 15/14* (2013.01); *G01C 9/02* (2013.01)

(58) Field of Classification Search
CPC ........ G01P 15/14; G01P 15/001; G01P 15/18; G01P 13/00; G01P 7/00; H01H 21/34; G08B 13/08
See application file for complete search history.

(56) References Cited

U.S. PATENT DOCUMENTS

| | | | |
|---|---|---|---|
| 5,736,923 A * | 4/1998 | Saab | G01C 21/18 |
| | | | 180/271 |
| 8,773,263 B2 * | 7/2014 | Thibault | G08B 29/22 |
| | | | 340/545.1 |
| 10,006,929 B2 * | 6/2018 | Ten Kate | G01P 7/00 |
| 2013/0057405 A1 | 3/2013 | Seelman | |
| 2016/0054148 A1 | 2/2016 | Misfatto | |
| 2016/0094766 A1 | 3/2016 | Stanley | |
| 2016/0189511 A1 | 6/2016 | Peterson | |
| 2016/0282112 A1 * | 9/2016 | Scheiermann | G01D 1/16 |

FOREIGN PATENT DOCUMENTS

| | | |
|---|---|---|
| EP | 0925967 A2 | 6/1999 |
| WO | 2008/033981 A2 | 3/2008 |
| WO | 2009/079685 A1 | 7/2009 |
| WO | 2016/066422 A1 | 5/2016 |

OTHER PUBLICATIONS

European Patent Office, International Search Report and Written Opinion for PCT/US2017/044101 dated Jan. 3, 2018 (21 pages).
European Patent Office, Invitation to Pay Additional Fees and Annex to Form PCT/ISA/206—Communication Relating to the Results of the Partial International Search for PCT/US2017/044101 dated Oct. 24, 2017 (18 pages).
Wikipedia, Gyroscope last modified Jun. 5, 2016 (18 pages).
https://developer.android.com/guide/topics/sensors/sensors_motion. html—Motion Sensors—Android Developers downloaded Jun. 23, 2016 (13 pages).

* cited by examiner

*Primary Examiner* — Matthew G Marini
*Assistant Examiner* — Leo T Hinze
(74) *Attorney, Agent, or Firm* — Trop, Pruner & Hu, P.C.

(57) ABSTRACT

In some examples, a sensor device is to mount to a barrier pivotable between an open position and a closed position, the barrier being on a moveable platform. The sensor device includes an accelerometer to measure acceleration data and a rotation sensor to measure rotation about an axis. The sensor device includes at least one processor configured to determine an open/close status of the barrier based on the acceleration data and the rotation data, and an orientation of the moveable platform.

21 Claims, 7 Drawing Sheets

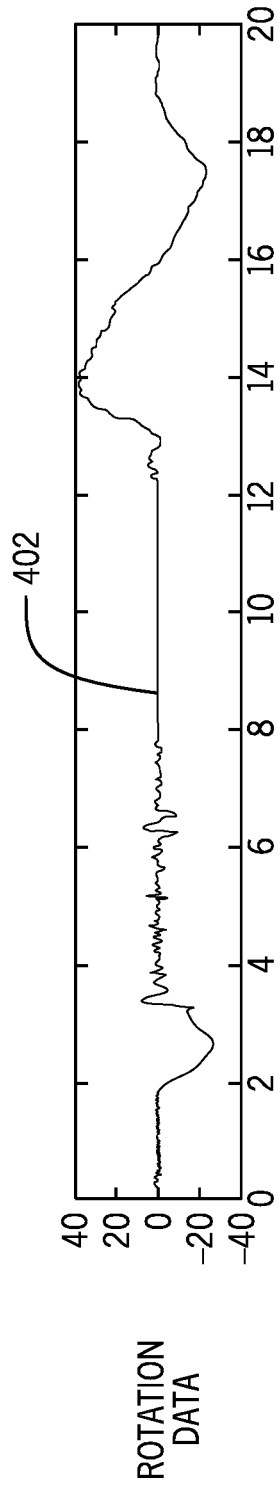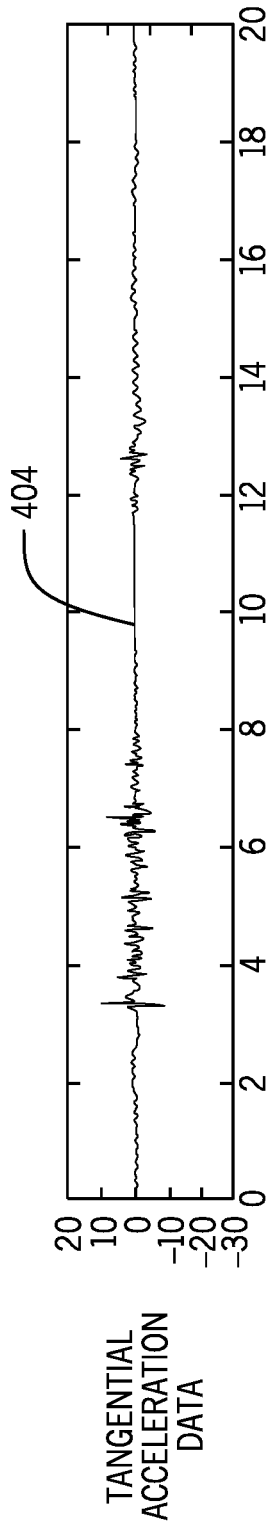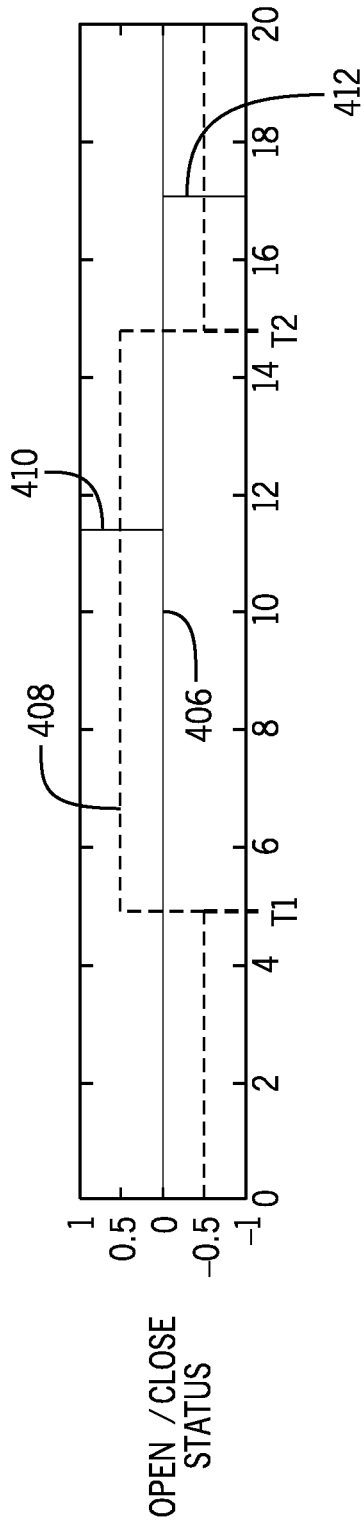

DETERMINING AN OPEN/CLOSE STATUS OF A BARRIER

BACKGROUND

Trucks, tractor-trailers, and tractors connected to chassis carrying containers can be used to transport cargo that includes goods. Trucks, trailers, and containers typically have doors that can be opened to allow access to cargo that is being transported, and closed to secure the items.

BRIEF DESCRIPTION OF THE DRAWINGS

Some implementations of the present disclosure are described with respect to the following figures.

FIGS. 4A-4C are graphs of various different data, according to some examples.

DETAILED DESCRIPTION

Figure 1A:
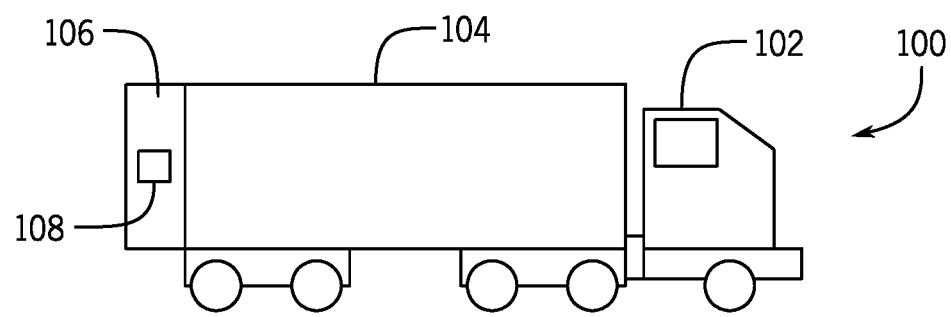
FIGS. 1A and 1B are schematic diagrams of a container hauled by a vehicle, the container including a door and a sensor device according to some examples mounted to the door.

A moveable platform can be used to carry physical items between different geographic locations. For example, the moveable platform can be a container (that is attached to a tractor), a truck, or a trailer in which the physical items can be stored during shipment. In other examples, the moveable platform can include another type of carrier structure that is able to carry physical items. More generally, the moveable platform can be part of, mounted on, or attached to a vehicle, such as a truck, a tractor, a car, a train, a ship, an airplane, and so forth. It is noted that although the present discussion refers to a moveable platform as a container, techniques or mechanisms according to some implementations of the present disclosure are applicable to other cargo carrying platforms with an entry barrier that can be opened and closed.

The moveable platform can include a door through which physical items can be loaded or unloaded into or from an inner chamber of the moveable platform, respectively. The door is an example of an entry barrier (or more simply "barrier") that can be opened and closed. Other examples of barriers include a window or any other structure that can be opened to allow entry through an opening, or closed to block entry through the opening.

In some cases, it may be desirable to detect when the barrier is in an open state or in a closed state. Due to movement of the moveable platform on which the barrier is mounted, it is possible for the orientation of the moveable platform to change as the moveable platform is moved to different locations. For example, at a first location, the moveable platform can be located on a relatively flat ground surface. However, at a second location, the moveable platform can be located on a slope.

Because the potential movement of the moveable platform can cause the orientation of the moveable platform to change (e.g., an angle of the moveable platform with respect to a horizontal plane can change), it may be challenging to determine an open/close status of the barrier using a single sensor. The "open/close status" of a barrier can refer to a status that indicates whether the barrier is in an open position or a closed position.

In accordance with some implementations of the present disclosure, techniques or mechanisms are provided to allow for the determination of the open/close status of a barrier that can be opened and closed (i.e., that can be moved between an open position and a closed position) irrespective of the orientation. The barrier is mounted on a moveable platform that is moveable between different geographic locations.

Typically, door opening and closing on a moveable platform is determined by a contact sensor (e.g., a Hall effect sensor) such that when the door is opened or closed the state change (contact made or broken) is detected by the contact sensor and communicated to a sensor device. This approach involves wiring the contact sensor to the sensor device. Moveable platforms can be subjected to rough handling with heavy cargo, and as a result, the wires between the contact sensor and the sensor device can easily be cut. Moreover, the additional wiring and installation adds cost. Techniques or mechanisms according to some implementations of the present disclosure do not have to employ additional wiring.

Figure 1B:
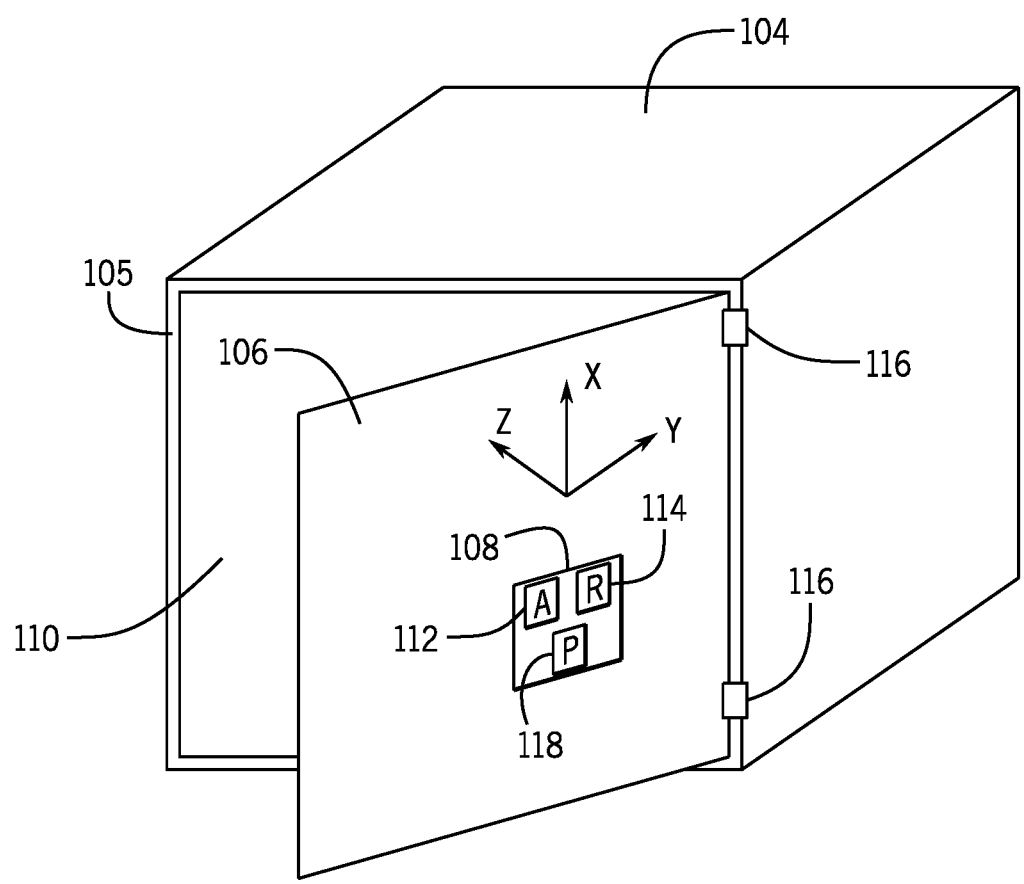

FIG. 1A illustrates an example truck 100 that includes a tractor unit 102 and a container 104 (provided on a chassis) hauled by the tractor unit 102. FIG. 1B is a perspective view of the container 104. The container 104 is an example of a moveable platform that can be used to carry physical items. The container 104 includes a door 106 that is pivotable between an open position and a closed position. In FIGS. 1A-1B, the door 106 is in the open position.

The door 106 is pivotally mounted on hinges 116, which are attached to a frame 105 (referred to as "door frame") of the container 104. The door 106 is able to rotate about the hinges 116 between the open position and the closed position. In FIG. 1A, two hinges 116 are shown. In other examples, the door 106 can be mounted on just one hinge, or on more than two hinges.

In accordance with some implementations of the present disclosure, a sensor device 108 is mounted to the door 106. The sensor device 108 can be mounted to an outer surface of the door 106 that faces the environment outside the container 104, or alternatively, the sensor device 108 can be mounted to an inner surface of the door 108 that faces into an inner chamber 110 of the container 104. In yet further examples, the sensor device 108 can be provided within a recess in the wall of the door 108.

The sensor device 108 can include sensors 112 and 114 and one or more processors 118 that are able to determine an open/close status of the door 106 based on output data from the sensors 112 and 114. Although the processor(s) 118 is depicted as being part of the sensor device 108 in some examples, it is noted that the processor(s) 118 can be separate from the sensor device 108 in other examples. More generally, sensors 112, 114 and the processor(s) 118 can either be integrated into the sensor device 108, such as on a circuit board or in an integrated circuit chip, or the sensors 112, 114 and the processor(s) 118 can be part of separate assemblies.

The sensor device 108 can also include a communication component to communicate over a network. In some examples, the sensor device 108 (along with other similar sensor devices arranged on barriers of other moveable platforms) can be part of a larger network of devices. This larger network of devices can be part of the "Internet-of-Things" (IoT) technology paradigm to allow different types of devices to communicate different types of data (including sensor data, voice data, video data, e-mail data, text messaging data, web browsing data, and so forth).

The ability of the sensor device 108 to communicate over a network can allow an entity (such as a distributor of goods, a manufacturer, or any other entity) to track assets of the entity as the assets are being transported throughout a geographic region.

In other examples, the sensor device 108 does not communicate data over a network.

Detecting the open/close status of the door 106 can be used to trigger various actions. For example, the sensor device 108 can send a notification (such as to a central service that is remotely located, or to the driver of the truck 100, or to another device on the truck 100) in response to detecting the door 106 in the open or closed position. Alternatively, the open/close status can be used to trigger measurement of other information (e.g., temperature, humidity, position of the container 104, or cargo load status, etc.), either by the sensor device 108 or by another sensor device. Other actions can be triggered by a detected open/close status in other examples.

The sensors of the sensor device 108 can include an accelerometer 112 and a rotation sensor 114. Although reference is made to an accelerometer or a rotation sensor in the singular sense, it is noted that techniques or mechanisms according to some implementations can be applied in other examples where there are multiple accelerometers and/or multiple rotation sensors that are part of the sensor device 108. The accelerometer 112 is used to measure acceleration along one or multiple axes, and can output acceleration data. The rotation sensor 114 is used to measure rotation about each of one or more axes. More specifically, the rotation sensor 114 can measure the rotation speed or rate of rotation about each respective axis.

In some examples, the rotation sensor 114 can include a gyroscope. In other examples, the rotation sensor 114 can include a rotation vector sensor, where a rotation vector produced by the rotation vector sensor represents the orientation of the rotation vector sensor as a combination of an angle and an axis, in which a device has been rotated through an angle around a specific axis.

Because the sensor device 108 is used to check the open/close status of a door that is mounted on a moveable platform, the rotation data from the gyroscope is used because comparing the acceleration data from the accelerometer against a threshold may not accurately determine the open/close status of the door, since the threshold that is used may not correspond to door movement depending upon the orientation of the frame (e.g., 105 in FIG. 1B) on which the door is mounted. In other words, different thresholds may have to be used for different door frame orientations. Note also that parameters can be used for determining the open/close status of a door. Such parameters trained and learned for one door frame orientation may not be valid for a different orientation of the door frame.

Thus, according to some implementations, since the door is mounted on a moveable platform whose position and orientation may change, the process for determining the open/close status of the door additionally uses rotation data from the gyroscope (or other rotation sensor) and further considers an orientation of the moveable platform.

In the ensuing discussion, reference is made to detecting the open/close status of a door, such as the door 106. It is noted that techniques or mechanisms according to some examples can be applied more generally to the detection of an open/close status of any type of barrier in other examples.

In FIG. 1B, three axes are defined: X, Y, and Z. In the view of FIG. 1B, the X axis points generally upwardly, which in the view of FIG. 1B is generally parallel with a rotation axis of each hinge 116. The door 106 is rotatable about the rotation axis of the hinge 116. The Y axis is a radial axis that is perpendicular to the X axis. In the view shown in FIG. 1B, the Y axis is parallel to the main surface of the door 106 and points towards the hinges 116. The Z axis is in a direction that is normal to the main surface of the door 106; when the door 106 is in the closed position, the Z axis points into the inner chamber 110 of the container 104.

Although reference is made to the X axis as pointing upwardly in the view shown in FIG. 1B, it is noted that in other examples, the X axis can point in a different direction. More generally, the X axis is parallel to the rotation axis of a hinge about which the door 106 is rotatably mounted. Thus, in a different example, a hinge of the door 106 can be mounted such that its rotation axis extends along a horizontal axis, or along a diagonal axis. In other examples, rolling doors that move up and down do not have hinges but have rollers or other mechanisms to move up and down.

In some examples, the accelerometer 112 can measure acceleration along each of the X, Y, and Z axes, and the rotation sensor 114 can measure rotation data about each of the X, Y, and Z axes. In other examples, the accelerometer 112 can measure acceleration in a subset of the X, Y, and Z axes, such as along the X and Y axes, and the rotation sensor 114 can measure rotation data about just the X axis.

Figure 2:
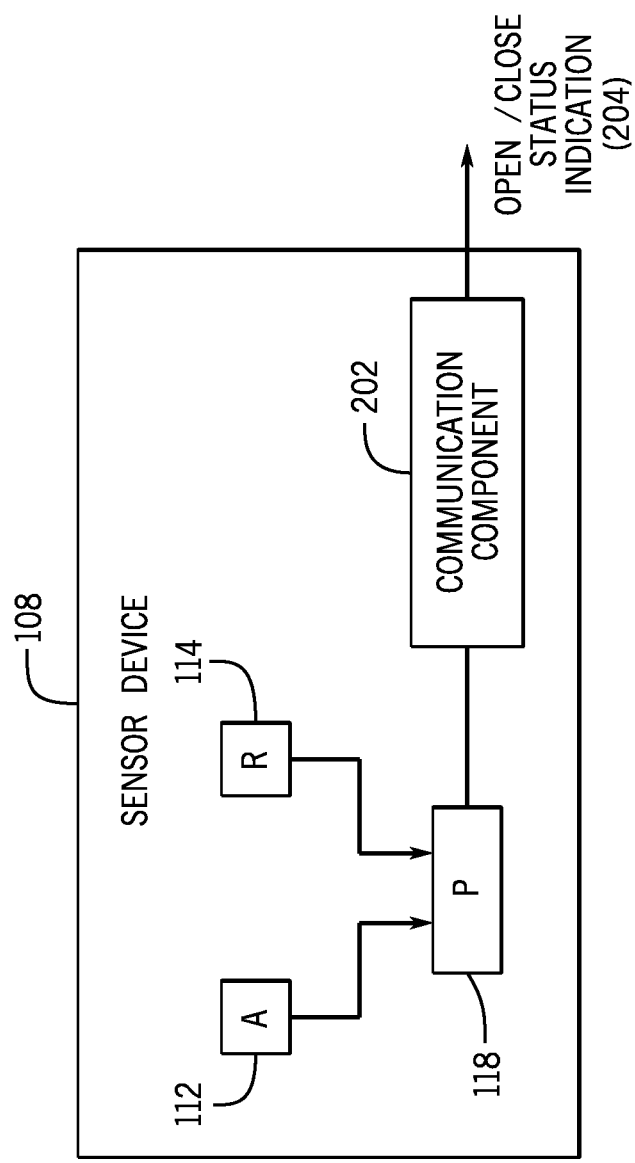
FIG. 2 is a block diagram of a sensor device according to some examples.

An example of the sensor device 108 is shown in FIG. 2. The sensor device 108 includes the accelerometer 112, the rotation sensor 114, and the one or more processors 118. The sensor device 108 can be implemented as a circuit board on which are mounted the accelerometer 112, the rotation sensor 114, and the processor(s) 118 plus associated memory and circuits, all housed in a suitable enclosure. In other examples, the sensor device 108 can be implemented as an integrated circuit chip with the accelerometer 112, the rotation sensor 114, and the processor(s) 118 plus associated memory and circuits, all housed in a suitable enclosure. In yet further examples, the processor(s) 118 can be separate from an assembly including the sensors 112 and 114.

The processor(s) 118 can receive acceleration data from the accelerometer 112, and rotation data from the rotation sensor 114. Based on the acceleration data and the rotation data, the processor(s) 118 can determine the open/close status of the door 106. The open/close status of the door 106 can be provided as an indication (e.g., in the form of a message, an information field in a message, or other indicator) to a communication component 202, which can transmit an open/close status indication 204 to a destination over a data network.

The communication component 202 can include a wireless transceiver and associated circuits to allow for wireless communication by the sensor device 108 to the data network. The wireless communication can include wireless communication over a cellular access network, a wireless local area network, a satellite network, and so forth.

Alternatively, the communication component 202 can include a wired transceiver and associated circuits to perform wired communications between the sensor device 108 and the destination.

The destination can include a server or a collection of servers and associated network equipment which may be located at one fixed location or in a mobile unit or as part of a data center or cloud.

In further examples, instead of communicating the open/close status indication 204 to a destination device that is external of the sensor device 108, an open/close indication for the door 106 can instead be used internally in the sensor device 108 to trigger an action, such as to cause other sensor(s) (not shown) of the sensor device 108 to measure one or more parameters or to take another action.

By using techniques or mechanisms according to some implementations of the present disclosure, the sensor device 108 is configured to allow a determination of the open/close status of a barrier without using any external wiring or accessory device (such as an external processing, communication, or storage device) outside the sensor device 108.

In the ensuing discussion, reference is made to examples where the rotation sensor 114 includes a gyroscope. In other examples, it is noted that techniques or mechanisms according to some implementations can be applied with other types of rotation sensors.

A gyroscope may consume a relatively large amount of power, in some cases greater than the power consumed by an accelerometer, for example. As such, it is desirable to maintain the gyroscope in a low power state, until the gyroscope is to be used for measuring rotation data. A low power state can refer to a state of the gyroscope where the gyroscope is powered off, or where some portion of the gyroscope is powered off to reduce power consumption by the gyroscope. The gyroscope can be activated to transition the gyroscope from the lower power state to an operational state, where the operational state of the gyroscope refers to a state of the gyroscope where the gyroscope can measure rotation data and output the rotation data.

Figure 3:
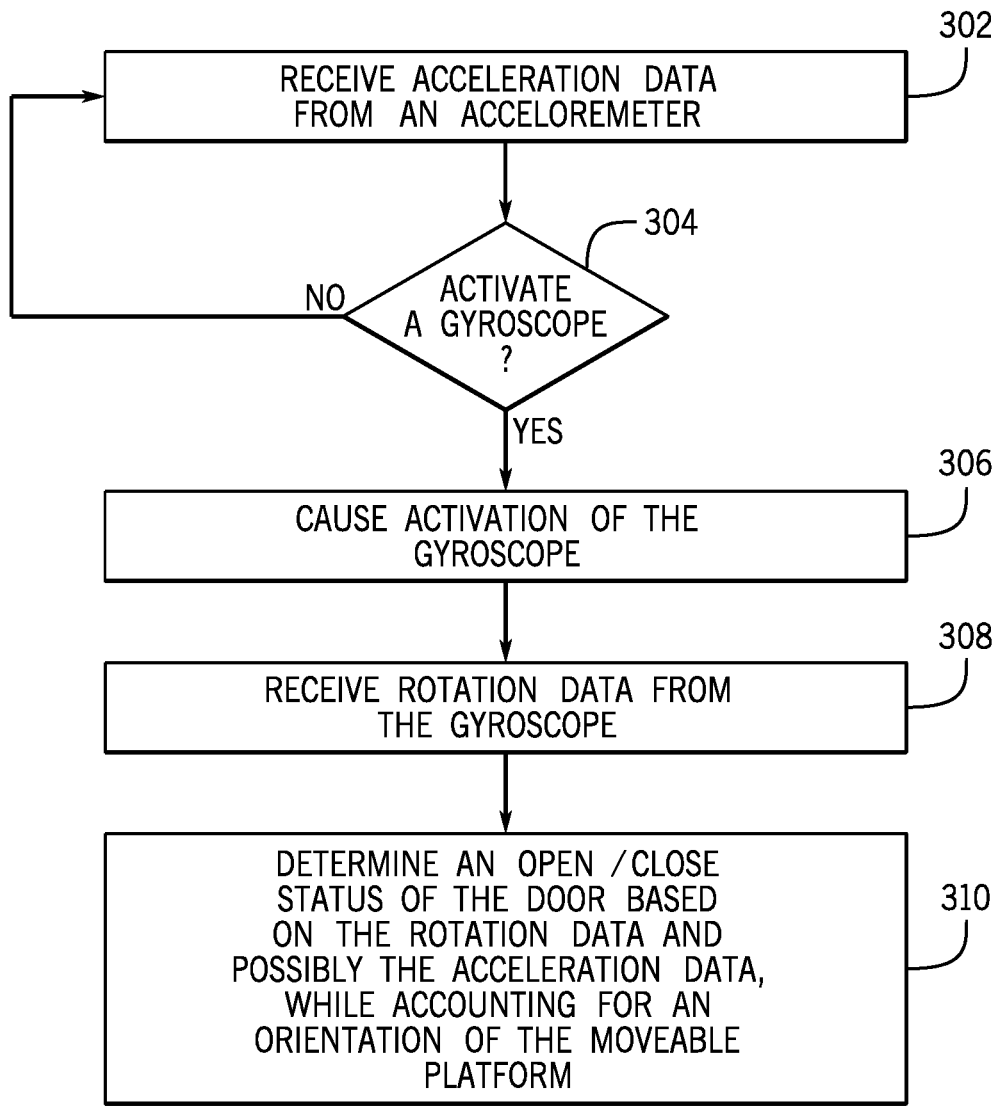
FIG. 3 is a flow diagram of a process to determine an open/close status of a door that can be pivoted between an open position and a closed position, according to some examples.

FIG. 3 is a flow diagram of a general door open/close (DOC) process of determining an open/close status of a door (e.g., the door 106) mounted on a moveable platform (e.g., the container 104). The DOC process of FIG. 3 can be performed by a computing device, such as by the processor(s) 118 according to some examples. The DOC process of FIG. 3 can receive (at 302) acceleration data from an accelerometer, such as the accelerometer 112 that is part of the sensor device 108 mounted on the door. The DOC process can determine (at 304) whether to activate a gyroscope (e.g., 114 in FIG. 1B or 2) based on the acceleration data from the accelerometer, where activating the gyroscope refers to transitioning the gyroscope from the low power state to the operational state.

If the gyroscope is not to be activated, then the DOC process can continue to receive further acceleration data from the accelerometer. However, if it is determined that the gyroscope is to be activated, then the DOC process can cause activation (at 306) of the gyroscope. The DOC process receives (at 308) rotation data from the activated gyroscope.

The DOC process of FIG. 3 further includes determining (at 310) an open/close status of the door based on the rotation data from the gyroscope (and possibly also on the acceleration data from the accelerometer). It is noted that the determined open/close status of the door also accounts for the orientation of the moveable platform on which the door is mounted, where the orientation can change as a result of the moveable platform moving to different locations. As discussed further below, a learning technique can be applied to compensate for noise due to an orientation of the moveable platform that deviates from a target orientation, as well as noise from other sources. For example, noise from other sources can include noise due to less than ideal calibration of the sensors, and/or noise due to an interference source that emits signals that cause interference with the operation of the sensors.

In some implementations, the DOC process can be disabled when the moveable platform is detected to be in motion. Detecting motion of the moveable platform can be based on the acceleration data from the accelerometer 112, based on positioning information from a global positioning system (GPS) receiver, based on speed information provided by the vehicle, and so forth. In response to detecting that the moveable platform is in motion, the DOC process deactivates determination of the open/close status of the door.

Although rotation data from the gyroscope can detect door opening with relatively high reliability, detecting door closing is analogous to proving a negative. As a result, the DOC process according to some implementations can use both the rotation data from the gyroscope and the acceleration data from the accelerometer under certain conditions to improve reliability in detecting door closing.

The following assumes that the accelerometer is a three-axis accelerometer that can measure acceleration data in each of the X, Y, and Z axes, and that the gyroscope is a three-axis gyroscope that can measure rotation data about each of the X, Y, and Z axes. However, in other examples, the acceleroemter and the gyroscope can measure respective measurement data for a smaller number of axes. For example, the accelerometer can measure acceleration data along only the Y and Z axes, and the gyroscope can measure rotation data about only the X axis.

The acceleration data from the accelerometer includes radial acceleration data (along the Y axis), tagential acceleration data (along the Z axis), and gravitational acceleration data (along the X axis), which are denoted by $r_1 r_2 \ldots$ (radial acceleration data), $t_1 t_2 \ldots$ (tangential acceleration data), and $v_1 v_2 \ldots$ (gravitational acceleration data. The rotation data from the gyroscope includes rotation data about the X axis, Y axis, and Z axis, which are denoted $g_{x,1} g_{x,2} \ldots g_{y,1} g_{y,2} \ldots$, and $g_{z,1} g_{z,2} \ldots$, respectively.

The gyroscope is to remain inactive until it is activated. In some implementations, once activated, the gyroscope can operate for a specified time duration, during which the gyroscope is able to measure rotation data. In response to expiration of the specified time duration, the gyroscope is deactivated to reduce power consumption.

The output of the DOC process includes an open/close indication $e_i$ at time point i, where $e_i$ can be set by the DOC process to one of multiple different values, such as:

$e_i=0$ indicates no door movement, $e_i=1$ indicates door closing movement (door closed status), and $e_i=1$ indicates door opening movement (door open status).

Although specific values of $e_i$ are provided above, it is noted that in other examples, $e_i$ can be set to different values to indicate different door status.

A door opening movement is characterized by the door opening by at least a specified angle (e.g., 8°, 10°, etc.) during the specified duration of operation of the gyroscope, in response to a detectable force.

A door closing movement is characterized by the door hitting the door frame with a detectable force and remaining stationary at the door frame for at least a second time duration, such as a fractional end portion of the specified time duration of operation of the gyroscope.

In some examples, the DOC process outputs a sequence $e_1 e_2, \ldots, e_N$, where N>1, for respective time points 1, 2, ..., N, and each $e_i$ at time point i can have one of the three example values noted above.

The accelerometer and gyroscope can be sampled at the same frequency $f_s$, such as 50 Hertz (Hz) or a different frequency.

FIGS. 4A-4C are three graphs that depict rotation data (FIG. 4A), tangential acceleration data (FIG. 4B), and the open/close status (FIG. 4C) as a function of time. A curve 402 in FIG. 4A depicts gyroscope rotation data about the X axis at respective time points. A curve 404 in FIG. 4B represents tangential acceleration data about the Z axis from the accelerometer at respective time points. A curve 406 represents a result of the open/close determination performed by the DOC process according to some examples. FIG. 4C also shows a ground truth curve 408 that indicates the actual open/close status of the door. The ground truth curve 408 being below value zero indicates that the door is closed, while the ground truth curve 408 being below zero indicates that the door is closed. As indicated by the ground truth curve 408, the door starts in the closed position, is moved to the open position, and is then moved to the closed position. In the example shown in FIG. 4C, as indicated by the ground truth curve 408, a door opening sequence is centered at time T1, while a door closing sequence is centered at time T2.

An upward spike 410 of the curve 404 indicates a door open status, while a downward spike 412 of the curve 404 indicates a door close status.

In general, the DOC process according to some implementations of the present disclosure includes two sub-processes: (1) determining whether to activate the gyroscope based on the acceleration data from the accelerometer, and (2) determining the open/close status of the door based on the gyroscope data and possibly the acceleration data.

Triggering Activation of the Gyroscope

The following describes the sub-process in the DOC process for triggering activation of a gyroscope, based on acceleration data from the accelerometer. Generally, the triggering of the activation of the gyroscope can be based on a variance of the acceleration data. Variance can refer to the expectation of the squared deviation of a random variable (in this case acceleration data) from its mean. The DOC process can determine whether the computed variance satisfies one or more conditions, and if so, that is an indication that the door may be moving and thus the gyroscope should be activated to perform the determination of the open/close status of the door.

For simplicity, in the following discussion, it is assumed that the DOC process uses just the tangential acceleration data $t_1 t_2 \ldots$ (along the Z axis) from the accelerometer to determine whether the gyroscope is to be activated or not. In other examples, the acceleration data along one or more of the X axis and Y axis can be used to determine whether the gyroscope is to be activated or not.

At time point i, the DOC process computes a gyroscope activation indication, $g_i$, as follows:

$g_i=1$ indicates that the gyroscope is to be activated; and
$g_i=0$ indicates that the gyroscope is not to be activated.

Although specific values for $g_i$ are noted above, it is contemplated that the gyroscope activation indication $g_i$ can have other values in other examples for indicating whether or not the gyroscope is to be activated.

Figure 5:
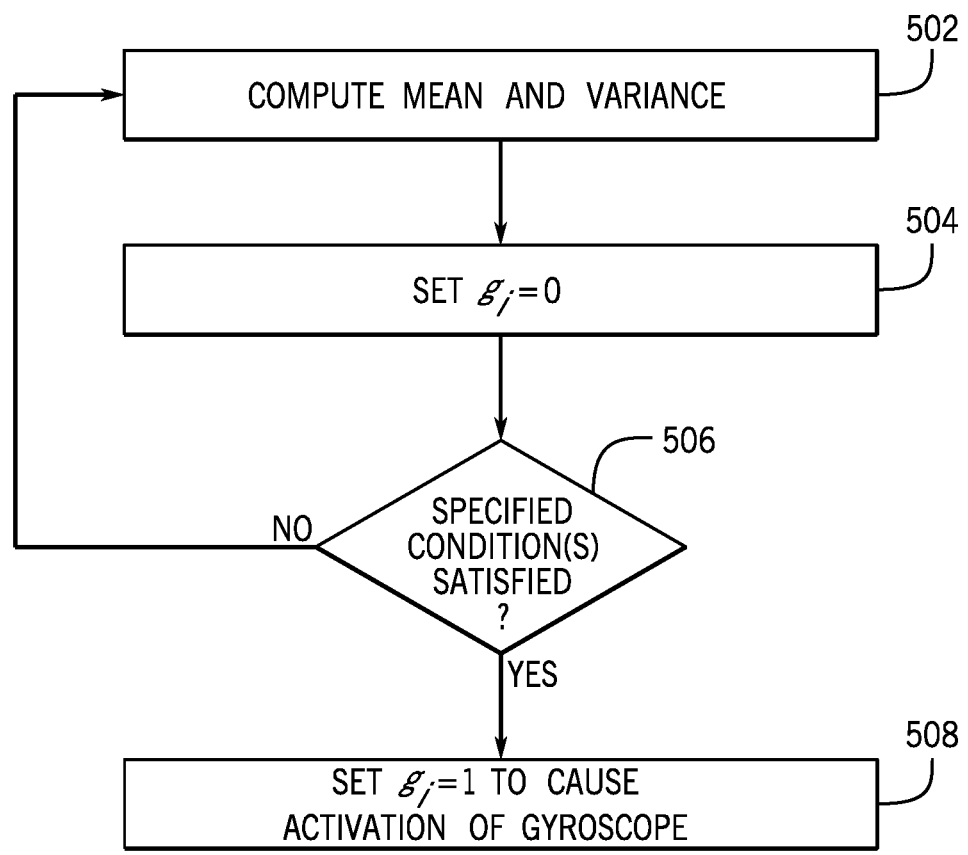
FIG. 5 is a flow diagram of a process to trigger activation of a rotation sensor, according to some examples.

FIG. 5 is a flow diagram of an example process to control activation of a gyroscope that is initially in a low power state. The process of FIG. 5 can be performed by the processor(s) 118 of FIGS. 1B and 2, or by a different computing device. In the following discussion, $\mu_{t,i}$ represents the mean of the tangential acceleration data $t_1 t_2 \ldots$ at each time point i, while $\sigma_{t,i}^2$ represents the variance of the tangential acceleration data $t_1 t_2 \ldots$ at each time point i. The process of FIG. 5 computes (at 502) parameters ($\mu_{t,i}, \sigma_{t,i}^2$) according to:

$$\mu_{t,i} = \frac{S_{t,i}}{K}, \quad \text{(Eq. 1)}$$

$$\sigma_{t,i}^2 = \frac{S_{t^2,i}}{K} - \mu_{t,i}^2, \quad \text{(Eq. 2)}$$

where $$S_{t,i} = \Sigma_{j=i-K+1}^{i} t_j, \quad \text{(Eq. 3)}$$

$$S_{t^2,i} = \Sigma_{j=i-K+1}^{i} t_j^2. \quad \text{(Eq. 4)}$$

In Eqs. 1-4, the parameter K is a specified constant value that represents a time window size in terms of number of samples of the tangential acceleration data over which the respective mean and variance are computed, where each sample is collected at a respective time point.

More generally, Eq. 3 sums the tangential acceleration data $t_1 t_2 \ldots$ from time point j=i-K+1 to a current time point i to compute $S_{t,i}$, and Eq. 4 sums the square of the tangential acceleration data $t_1 t_2 \ldots$ from time point j=i-K+1 to a current time point i to compute $S_{t^2,i}$. The values $S_{t,i}$ and $S_{t^2,i}$ are used in Eqs. 1 and 2, respectively, to compute the mean $\mu_{t,i}$ and the variance $\sigma_{t,i}^2$.

The process sets (at 504) $g_i=0$.

The process determines (at 506) if one or more of specified conditions G1 and G2 are satisfied, where $\sigma_{t,i}^2 > C_1 \sigma_{t,i-K}^2$, Condition G1:

$\sigma_{t,i}^2 > C_2$ Condition G2:

Condition G1 relates to whether the variance $\sigma_{t,i}^2$ computed according to Eq. 2 is greater than $C_1 \sigma_{t,i-K}^2$, where $C_1$ is a specified constant value. Condition G1 includes a comparison of a current variance $\sigma_{t,i}^2$ at time point i with a value based on a product of the constant $C_1$ and the variance $\sigma_{t,i-K}^2$ computed at the beginning of the time window at i-K.

Condition G2 relates to a determination of whether a current variance $\sigma_{t,i}^2$ at time point i is greater than a threshold $C_2$, which is a specified constant value.

In the foregoing computations, the constants $C_1$ and $C_2$ are used to determine if the force used to generate tangential movement is significant enough in that it may be due to door opening or closing. The values of K, $C_1$, and $C_2$ can be empirically set based on past experience and the specific characteristics of the sensor device and the door whose open/close status is to be determined. In some examples, K=25, C1=16, and C2=0.6. However, in other examples, other values of K, $C_1$, and $C_2$ can be used. For example, $C_2$ may be determined by statistics, e.g. variance, from accelerometer readings from other axes, e.g. the X axis, the Y axis, or a combination of both X and Y axes. Note that the variance of acceleration along the X axis is often used to determine whether the platform on which the door is mounted, e.g. a container or a trailer, is moving or not. $C_2$ as a function of the variance of acceleration along the X axis essentially indicates that G2 is conditioned upon the movement of the platform.

If either condition G1 or G2 is satisfied, then the process sets (at 508) $g_i=1$, to cause activation of the gyroscope. However, if neither condition G1 nor G2 is satisfied, then the process maintains $g_i=0$ and returns to task 502.

In further examples, in task 502, the variance $\sigma_{t,i}^2$ may be multiplied by $$\frac{K}{K-1}$$

to obtain an unbiased sample variance. Furthermore, $S_{t,i}$ in Eq. 3 may be efficiently computed from $S_{t,i-1}$ by using the following equation.

$$S_{t,i}=S_{t,i-1}-t_{i-K}+t_i. \quad \text{(Eq. 5)}$$

Similarly, $S_{t^2,i}$ in Eq. 4 may be efficiently computed from $S_{t^2,i-1}$ by using $$S_{t^2,i}=S_{t^2,i-1}-t_{i-K}^2+t_i^2. \quad \text{(Eq. 6)}$$

In alternative examples, $\mu_{t,i}$ and $\sigma_{t,i}^2$ in task 502 may be approximated by using infinite impulse response (IIR) filters. Let $\alpha$ denote an IIR filter parameter. Then $$\bar{\mu}_{t,i}=(1-\alpha)\bar{\mu}_{t,i-1}+\alpha t_i, \quad \text{(Eq. 7)}$$

$$\bar{S}_{t,i}=(1-\alpha)\bar{S}_{t,i-1}+\alpha t_i^2, \quad \text{(Eq. 8)}$$

$$\bar{\sigma}_{t,i}^2=\bar{S}_{t,i}-\bar{\mu}_{t,i}. \quad \text{(Eq. 9)}$$

In such alternative examples, the FIG. 5 process can be modified to use the variance $\bar{\sigma}_{t,i}^2$ computed according to Eq. 9 rather than the variance $\sigma_{t,i}^2$ computed according to Eq. 2.

Also, tasks 506 and 508 can be modified to detect if conditions G1 and G2 are consistently met over a number of consecutive samples to reduce false positives. In other words, rather than set $g_i=1$ when condition G1 or G2 is satisfied for time point i, the setting of $g_i=1$ is based on whether the condition G1 or G2 is also satisfied over the next number of time points. In the case where IIR filters are used, the threshold on the number of samples over which conditions G1 and G2 are evaluated may be adaptive to $\sigma_{t,i}^2$—the larger $\sigma_{t,i}^2$ is observed, the higher the threshold is, reflecting the fact that the IIR filters have longer tails for larger values.

Detecting Open/Close Status of the Door

The following process describes how the open/close status of the door is determined, based on rotation data from the gyroscope. It is noted that in some cases, the closed status of the door may not be determined with just the rotation data; in such cases, acceleration data would also be used.

Figure 6:
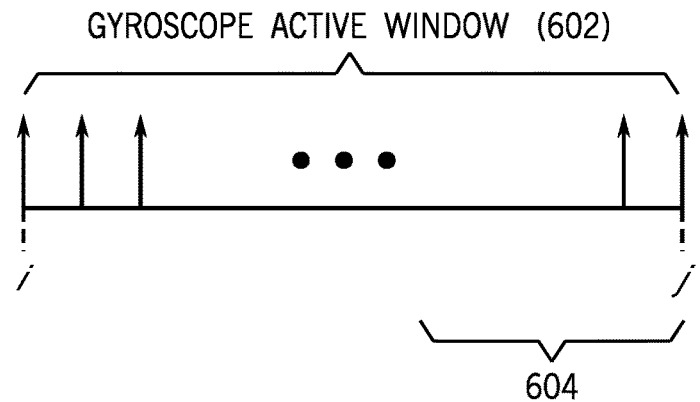
FIG. 6 is a graph of a gyroscope active window according to some examples.

Once the gyroscope is triggered at time point i in response to setting $g_i=1$ (task 508 in FIG. 5), the gyroscope remains active for a specified time duration (e.g., three seconds or some other time duration). The reason that the gyroscope stays on for the specified time duration is to ensure that the gyroscope returns to a low power state after the rotation data measurements have been made in the specified time duration. In some examples, at a sampling frequency $f_s=50$ Hz, assuming a three-second time duration when the gyroscope is activated, a total of 150 rotation data samples from the gyroscope are collected for use in detecting door opening and closing. In other examples, different time durations and different sampling frequencies can be used. In the ensuing discussion, the time duration during which the gyroscope is activated to collect rotation data is referred to as the "gyroscope active window," shown as 602 in FIG. 6. In FIG. 6, each upwardly pointing arrow represents a rotation data sample collected at a respective time point by the gyroscope.

Since door movement in some examples involves rotation along the X axis, the DOC process uses just the gyroscope's rotation data about the X axis, $g_{x,i}, g_{x,i+1} \ldots g_{x,i+149}$ (assuming that 150 samples of rotation data are collected in the gyroscope active window 602).

Figure 7:
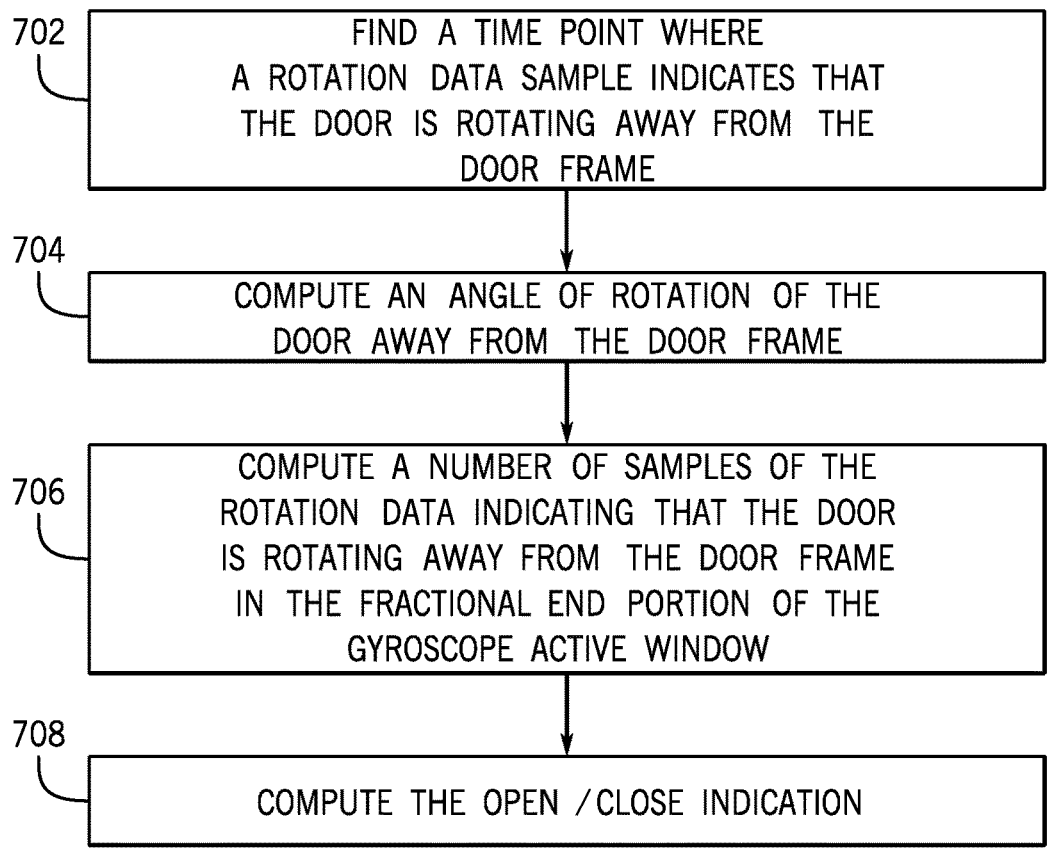
FIG. 7 is a flow diagram of a process to compute an open/close status of a door according to further examples.

Let $j=i+149$, where j represents the end of the gyroscope active window 602, and i represents the beginning of the gyroscope active window. The DOC process computes the open/close indication $e_j$ based on rotation data samples $g_{x,i}, g_{x,i+1} \ldots g_{x,j}$ (from time point i to time point j) according to the process shown in FIG. 7. As noted above, the open/close indication $e_j$ can be set to one of three values (−1 to indicate door open, 1 to indicate door close, and 0 to indicate otherwise).

Task 702: In some examples, the process finds the smallest time point k (in the time range from time point i to time point j) where a rotation data sample $g_{x,k}$ indicates that the door is rotating away from the door frame (e.g., 105 in FIG. 2B). Note that the door is rotating away from the door frame if $g_{x,k}>0$. Stated differently, this task involves finding the index k such that $g_{x,k} \geq 0$, $i \leq k \leq j$ and denoting this smallest index k by k*. If no such k exists, set $k^*=j+1$.

In other examples, instead of finding the smallest time point k, the process may choose, for example, to save computational complexity, to find a time point k where a rotation data sample $g_{x,k}$ indicates that the door is rotating away from the door frame.

Task 704: The process computes an angle of rotation of the door away from the door frame by computing an approximate integration of the rotation data samples from the gyroscope, in the time range from time point k* to time point j. The approximate integration of the rotation data is computed as $$a_j=\Sigma_{k=k^*}^{j} g_{x,k}, \text{ if } k^* \leq j,$$

$$a_j=0 \text{ if } k^* > j. \quad \text{(Eq. 10)}$$

In Eq. 10 above, $a_j$ is produced by aggregating (e.g., summing) the rotation data samples, which produces an aggregate value, $a_j$, that represents an approximation of the rotation angle of movement of the door (i.e., how many degrees the door has rotated about the X axis).

Task 706: The process computes a number of samples of the rotation data ($g_{x,k}$) indicating that the door is rotating away from the door frame, in a fractional end portion (604 shown in FIG. 6) of the gyroscope active window 602. In the case of a door close event, the number of samples of the rotation data indicating that the door is opening in the fractional end portion 604 should be less than some specified threshold. Even when the door has hit the door frame when being closed, vibration of the door due to the elasticity of the door can cause some rotation data samples in the fractional end portion 604 of the gyroscope active window 602 to be greater than zero (to indicate movement away from the door frame). More specifically, this number of samples of the rotation data indicating that the door is opening in the fractional end portion 604 is expressed as $$n_j=|\{k: |g_{x,k}|>0.2, j-f_s/2 \leq k \leq j\}|. \quad \text{(Eq. 11)}$$

In Eq. 11, $j-f_s/2 \leq k \leq j$ corresponds to the duration of the fractional end portion 604, which starts at $j-f_s/2$ and ends at j.

Task 708: The process computes the open/close indication $e_j$ as follows.

$e_j=1$ if $a_j>C3$;
$e_j=1$ if $a_j<C4$ and $n_j \leq C5$;
$e_j=0$ otherwise

The open/close indication $e_j$ is computed based on comparing the angle of rotation of the door away from the door frame ($a_j$) with respect to thresholds C3 and C4, and based on comparing $n_j$ to the threshold C5.

The parameters C3, C4, and C5 are specified constants. The parameter C3 represents a threshold amount of rotation angle (e.g., 8°, 10°, etc.) that the door has to rotate in a direction away from the door frame to indicate that the door has moved to the open position. For example, C3 is set to 8 to indicate 8°, set to 10 to indicate 10°, and so forth. Thus, $a_j>C3$ indicates that the door has rotated away from the door frame by more than C3 degrees.

The parameter C4 represents a threshold amount of rotation angle (e.g., 3°, etc.) that $a_j$ should be less than to indicate that the door has possibly moved to the closed position.

Thus, generally, the DOC process determines that the door has moved to the open position in response to the aggregate value, $a_j$, having a specified relation with respect to a first threshold (e.g., $a_j>C3$). The DOC process determines that the door has moved to the closed position in response to the aggregate value, $a_j$, having a specified relationship with respect to a second threshold (e.g., $a_j<C4$), and further based on another condition that confirms the door closed status (e.g., $n_j \leq C5$).

The parameter C5 (e.g., 2, etc.) represents a threshold number of samples of rotation data exceeding zero (to indicate rotation away from the door frame) used to confirm a door close event. Thus, $n_j \leq C5$ specifies that the number of samples of rotation data indicating that the door is opening in the fractional end portion 604 is less than or equal to C5. More generally, $n_j$ is a stationary indication value for indicating whether the door is stationary (e.g., $n_j \leq C5$ indicates that the door is stationary). If both $a_j<C4$ and $n_j \leq C5$ are true, then a door close status is confirmed, and $e_j$ is set to 1.

However, if $a_j<C4$ but $n_j>C5$, the door may still be in the middle of a closing sequence before stopping. In view of this, the DOC process can continue checking (for up to 5 seconds or another time duration, for example) if the tangential acceleration data $t_{j+1} t_{j+2} \ldots$, and the radial acceleration data $r_{j+1} r_{j+2} \ldots$ converge to stationary values estimated when the door is still and closed. If convergence of the tangential acceleration data and the radial acceleration data is detected at time point $j'>j$, then the DOC process sets $e_{j'}=1$.

Thus, a determination of a closed status of the door under the condition that $a_j<C4$ but $n_j>C5$ is based on the rotation data from the gyroscope and a determined convergence that is based on the orientation of the moveable platform on which the door is mounted. More specifically, the determination of the closed status of the door is based on the rotation data and convergence of the acceleration data that is based on the orientation of the moveable platform.

The convergence of tangential acceleration data and radial acceleration data is discussed further below.

Stationary Noise Level

As noted above, the orientation of the moveable platform can change as a result of movement of the moveable platform to different locations. For example, if the moveable platform is on a slope, that can affect what values of the acceleration data would indicate a closed status of the door. In addition, there can be other noise that is present in measured data from the sensors of the sensor device 108, such as noise due to less than ideal calibration of the sensors, or noise due to an interference source.

The following describes a technique for determining mean values and variance values of acceleration data that can be used for indicating the closed status of the door.

When the door remains stationary and closed, the acceleration magnitude of the accelerometer data along the Y, Z, and X axes, i.e., $$M_i = \sqrt{r_i^2 + t_i^2 + v_i^2} \qquad \text{(Eq. 12)}$$

should be close to the gravity of earth at around 9.8 meters per second (m/s²). If the door is on a moveable platform that is on a horizontal surface, then the radial and tangential acceleration data, $r_i$ and $t_i$, should be zero or close to zero. Depending upon the orientation of the accelerometer (or equivalently the orientation of the door on which the accelerometer is mounted), the gravity may be distributed to all three axes. Consequently, even if the door remains still, $r_i$ and $t_i$ may be non-zero if the X axis of the accelerometer is not perfectly aligned with the opposite direction of earth's gravity.

The following describes a process to learn the stationary values of $r_i$ and $t_i$, i.e., the values when the door is stationary and closed, where the stationary values of $r_i$ and $t_i$ account for the orientation of the moveable platform on which the door is mounted. The learned stationary values of $r_i$ and $t_i$ that take into account the orientation of the moveable platform are then used to determine convergence of the tangential and radial acceleration data for the purpose of determining whether the door is closed, as discussed further above.

Let L be a positive integer, where L divides a sequence of acceleration data samples (radial acceleration data samples and tangential acceleration data samples) into L sub-sequences. Example values of L can be 7, 8, 11, 13, 16, and so forth.

Figure 8:
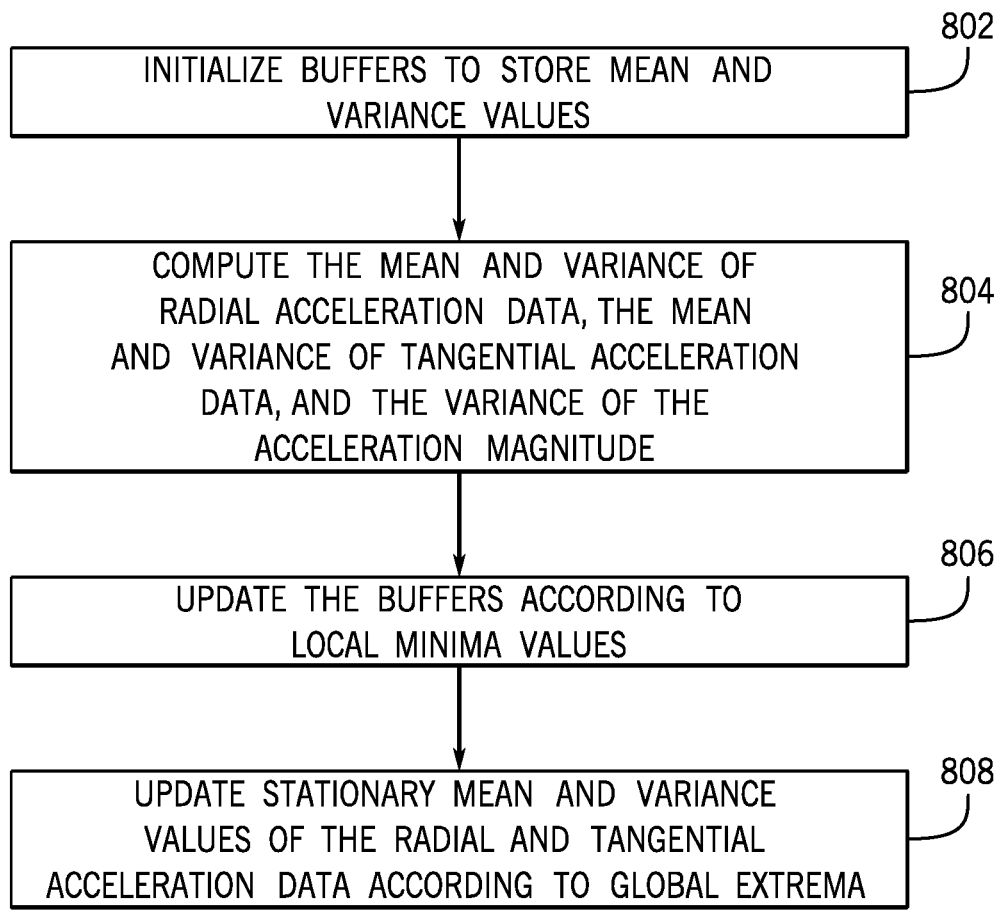
FIG. 8 is a flow diagram of computing stationary mean and variance values of acceleration data, according to further examples.

The process of learning stationary values of acceleration data (radial acceleration data and tangential acceleration data) is depicted in FIG. 8.

Task 802: The process initializes the following buffers, $A_M$, $A_t$, $A_r$, $B_t$, and $B_r$ such that $A_{M,l}=M^*$, $l=0, \ldots, L-1$, where $M^*$ denote a large enough value such that $M_i \leq M^*$ for all time points i, and the remaining four buffers are filled with zeros (or arbitrary numbers). The buffer $A_t$ is used to store a computed stationary mean value of the tangential acceleration data, the buffer $A_r$ is used to store a computed stationary mean value of the radial acceleration data, the buffer $B_t$ is used to store a computed stationary variance value of the tangential acceleration data, and the buffer $B_r$ is used to store a computed stationary variance value of the radial acceleration data. The buffer $A_M$ is used to store a stationary variance value of the acceleration magnitude ($M_i$ calculated according to Eq. 12) of the acceleration data.

Although FIG. 8 refers to an example where specific buffers are used, it is noted that in other examples, other data structures can be used to store the respective values.

Task 804: The process computes the mean and variance of the radial acceleration data ($\mu_{r,i}, \sigma_{r,i}^2$), the mean and variance of the tangential acceleration data ($\mu_{t,i}, \sigma_{t,i}^2$), and the variance of the acceleration magnitude ($\sigma_{M,i}^2$) using computations similar to that performed in Eqs. 1-4 above.

Task 806: Since a sequence of acceleration data samples is divided into L sub-sequences, in some examples, L buffers are used to store the respective variance and mean values computed for the respective sub-sequences. In other words, there are: $L A_M$ buffers, represented as $A_{M,0}$ to $A_{M,L-1}$; $L A_t$ buffers, represented as $A_{t,0}$ to $A_{t,L-1}$; $L A_r$ buffers, represented as $A_{r,0}$ to $A_{r,L-1}$; $L B_t$ buffers, represented as $B_{t,0}$ to $B_{t,L-1}$; and $L B_r$ buffers, represented as $B_{r,0}$ to $B_{r,L-1}$. At task

806, the process updates the buffers according to local minima values, as follows. Let s=i mod L. If $\sigma_{M,i}^2 < A_{M,s}$, then update the buffers as follows.

$$A_{M,s} = \sigma_{M,i}^2,$$

$$A_{t,s} = \mu_{t,i},$$

$$A_{r,s} = \mu_{r,i},$$

$$B_{t,s} = \sigma_{t,i}^2,$$

$$B_{r,s} = \sigma_{r,i}^2.$$

In the foregoing, s=0 . . . L−1, and if the current variance of the acceleration magnitude at time point i ($\sigma_{M,i}^2$) less than the value in the buffer $A_{M,s}$, then the buffer $A_{M,s}$ is updated with the value $\sigma_{M,i}^2$, and the remaining buffers $A_{t,s}$, $A_{r,s}$, $B_{t,s}$, and $B_{r,s}$ are updated with respective mean and variance values $\mu_{t,i}$, $\mu_{r,i}$, $\sigma_{t,i}^2$, and $\sigma_{r,i}^2$.

Effectively, after all of the tangential and radial acceleration data samples have been processed, the L buffers $A_{t,0}$ to $A_{t,L-1}$ contain L respective local minima of the mean $\mu_{t,i}$ of the tangential acceleration data samples. Similarly, the L buffers $A_{r,0}$ to $A_{r,L-1}$ contain L respective local minima of the mean $\mu_{r,i}$ of the radial acceleration data samples, the L buffers $B_{t,0}$ to $B_{t,L-1}$ contain L respective local minima of the variance $\sigma_{t,i}^2$, of the tangential acceleration data samples, and the L buffers $B_{r,0}$ to $B_{r,L-1}$ contain L respective local minima of the variance $\sigma_{r,i}^2$ of the radial acceleration data samples.

Task 808: If i mod T==0, then the process updates the stationary mean and variance values of the radial and tangential acceleration data according to global extrema. More specifically, in some examples, the process finds the index $l^* = \arg \max_l A_{M,l}$, which finds the maximum (an example of the global extrema) of each of the variance values in the L buffers $A_{M,0}$ to $A_{M,L-1}$. Note that T represents a learning time period expressed as a number of acceleration data samples. In other words, every T time period, the mean and variance values of the radial and tangential acceleration data is updated as $\bar{\mu}_t$, $\bar{\mu}_r$, $\bar{\sigma}_t^2$, and $\bar{\sigma}_r^2$. Task 808 includes:

- recording $\bar{\mu}_t = A_{t,l^*}$ and $\bar{\mu}_r = A_{r,l^*}$ as the stationary estimates of tangential and radial components, respectively;
- recording $\bar{\sigma}_t^2 = B_{t,l^*}$ and $\bar{\sigma}_r^2 = B_{r,l^*}$ as the estimates of tangential and radial variance corresponding to the stationary values, respectively; and
- resetting $A_M$ such that $A_{M,l} = M^*$, l=0, . . . , L−1.

In the above, T may depend upon the sampling frequency $f_s$. For example, the process can select T=30 $f_s$ or T=600 $f_s$, resulting in a learning period of 30 seconds and 10 minutes, respectively. T can have other values in other examples.

Note that task 806 essentially computes $$\min\{\sigma_{M,i}^2; i \bmod L = s\}. \tag{Eq. 13}$$

As such, the process described above is a maxmin method. In other examples, a minmax method can be used to estimate the stationary radial and acceleration mean and variance values by altering the order of minimization and maximization operations in tasks 806 and 808 above.

More generally, finding the mean and variance of the tangential and radial acceleration data values $\bar{\mu}_t$, $\bar{\mu}_r$, $\bar{\sigma}_t^2$, and $\bar{\sigma}_r^2$ involves 1) finding local extrema values (minimum values or maximum values depending upon whether the maxmin method or the minmax method is used) for respective sub-sequences $\{\sigma_{M,i}^2; i \bmod L = s\}$, 2) then finding a global extrema (either maximum or minimum depending upon whether the maxmin method or the minmax method is used) in the local extrema values, and 3) finally determining the mean and variance of the tangential and radial acceleration data values that correspond to the global extrema found (e.g., co-located). For example, if the global extrema is reached at time instant i*, then the mean and variance computed at time instant i*, i.e., $\mu_{t,i^*}$, $\mu_{r,i^*}$, $\sigma_{t,i^*}^2$, and $\sigma_{r,i^*}^2$, may be used as the estimates of $\bar{\mu}_t$, $\bar{\mu}_r$, $\bar{\sigma}_t^2$, and $\bar{\sigma}_r^2$, respectively.

The stationary mean and variance values of the tangential and radial acceleration data values $\bar{\mu}_t$, $\bar{\mu}_r$, $\bar{\sigma}_t^2$, and $\bar{\sigma}_r^2$ can be used directly in detecting convergence of the tangential and radial acceleration data as discussed above for determining whether a door close event has occurred. For each learning period, the current stationary mean tangential and acceleration data values $\bar{\mu}_t$ and $\bar{\mu}_r$ can be used for the next T samples until new estimates are available for the next learning period.

In further examples, the stationary mean tangential and radial acceleration data values can be filtered, such as by using an IIR filter. For example, instead of using $\bar{\mu}_t$, a filtered version can be computed as follows:

$$\tilde{\mu}_t = \tilde{\mu}_t(1-\alpha_t) + \alpha_t \bar{\mu}_t, \tag{Eq. 14}$$

where $\tilde{\mu}_t$ denotes the IIR filtered version of $\bar{\mu}_t$. In some examples, $\tilde{\mu}_t$ may be initialized to a default value at the beginning of the filtering process. Similar filters may be applied to $\bar{\mu}_r$, $\bar{\sigma}_t^2$, and $\bar{\sigma}_r^2$ to obtain $\tilde{\mu}_r$, $\tilde{\sigma}_t^2$, and $\tilde{\sigma}_r^2$.

With $\bar{\mu}_t$, $\bar{\mu}_r$, $\bar{\sigma}_t^2$, and $\bar{\sigma}_r^2$, or equivalently $\tilde{\mu}_t$, $\tilde{\mu}_r$, $\tilde{\sigma}_t^2$, and $\tilde{\sigma}_r^2$, a process according to some implementations can detect if $t_{j+1} t_{j+2}$ . . . and $r_{j+1} r_{j+2}$ . . . converge by checking if the following two equalities are satisfied:

$$|t_j - \bar{\mu}_t| \le C_t \sqrt{\bar{\sigma}_t^2}, \text{ and} \tag{Eq. 15}$$

$$|r_j - \bar{\mu}_r| \le C_r \sqrt{\bar{\sigma}_r^2}, \tag{Eq. 16}$$

where $C_t$ and $C_r$ are specified constants. Example values of $C_t$ and $C_r$ are 1.2, 1.5, 2.0, and so forth. Note that $C_t$ may be different from $C_r$ so that the tangential and radial acceleration data components are treated differently in testing convergence. Reasons for introducing such bias include different prior knowledge and/or different applications. Further note that in order to improve robustness and to reduce false positives, convergence is detected at time point $j+N_c-1$ if and only if Eqs. 15 and 16 hold true for all j, j+1, . . . , $j+N_c-1$, where $N_c$ is a positive integer. Examples of $N_c$ are 5, 10, $f_s/2, f_s$, . . . .

Eqs. 15 and 16 may also be used to determine whether the door is in an open state in cases where the gyroscope is not available, either by design or by choice (e.g., for the purpose of power saving). For example, if over a period of time, Eqs. 15 and 16 are only satisfied occasionally, then it is determined that the door is in an open state.

Further note that in some examples, other computable statistics may be used in place of the variance of the acceleration magnitude $\sigma_M^2$ to determine local minima and the global extrema. Examples include the variance of the accelerometer's data along one of its axes, the variance of a function of the accelerometer's data (e.g., the L2 norm of two of its axes), a function of the variance of the accelerometer's data along its axes (e.g. a linear combination of the tangential variance and the radial variance), similar functions of the gyroscope's data, or a combination of functions of both the accelerometer's data and the gyroscope's data.

The process above can also be used to learn the bias and/or noise levels of the gyroscope data along one or more of its axes. For example, in the case where the gyrocope and the accelerometer are part of the same sensor device, the variance of accelerometer or its functions may be used to determine the local minima (see Eq. 13) and the global extrema. The time at which the globe extrema is reached may then be used to approximate the time at which the sensor device is in a stationary position/state. Finally the gyroscope sample/mean at the time of the determined globe extrema may be used as the estimate of the bias of the gyroscope. Similarly, the gyroscope variance at the time of the global extream may be used as the estimate of the noise level of the gyroscope when the sensor device is in a stationary position/state.

The processes described above can be performed by the processor(s) 118 of the sensor device 108. In some examples, the processes can be performed by machine-readable instructions executable on the processor(s) 118. The machine-readable instructions can be stored in a non-transitory computer-readable or machine-readable storage medium. The storage medium can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed or removable disks; or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
   a sensor device to mount to a barrier pivotable between an open position and a closed position, the barrier pivotably mounted on a moveable platform that is moveable between different locations during operation of the moveable platform, the sensor device comprising a rotation sensor to measure rotation about an axis, and an accelerometer to measure acceleration; and
   at least one processor configured to:
      learn a convergence value of acceleration data for a current orientation of the moveable platform, wherein the convergence value is different for different orientations of the moveable platform;
      determine an open/close status of the barrier based on rotation data from the rotation sensor and convergence of acceleration data from the accelerometer based on the learned convergence value for the current orientation of the moveable platform; and
      trigger an action in response to the determining of the open/close status of the barrier.

2. The apparatus of claim 1, wherein the at least one processor is configured to determine that the barrier has moved to the closed position based on the rotation data from the rotation sensor and determining that the acceleration data from the accelerometer has converged based on the learned convergence value.

3. The apparatus of claim 1, wherein the learned convergence value comprises stationary mean and variance values of acceleration data.

4. The apparatus of claim 3, wherein the at least one processor is configured to compute the stationary mean and variance values of acceleration data based on finding local extrema values for respective sub-sequences of acceleration data samples, and then finding a global extrema in the local extrema values.

5. The apparatus of claim 1, wherein the at least one processor is configured to determine the open/close status of the barrier based on aggregating rotation data from the rotation sensor at a plurality of time points, the aggregating producing an aggregate value that represents an angle of rotation of the barrier.

6. The apparatus of claim 5, wherein the at least one processor is configured to determine that the barrier has moved to the open position in response to the aggregate value having a specified relation with respect to a first threshold, and that the barrier has moved to the closed position in response to the aggregate value having a specified relationship with respect to a second threshold.

7. The apparatus of claim 6, wherein the plurality of time points are part of a time window, and wherein the at least one processor is configured to further compute, based on the rotation data at time points in an end portion of the time window, a stationary indication value indicating whether the barrier is stationary.

8. The apparatus of claim 7, wherein the at least one processor is configured to determine that the barrier has moved to the closed position in response to the aggregate value being less than the second threshold and the stationary indication value being less than a stationary indication threshold.

9. The apparatus of claim 8, wherein the at least one processor is configured to determine that the barrier has moved to the closed position in response to the aggregate value being less than the second threshold, and the stationary indication value being greater than the stationary indication threshold.

10. The apparatus of claim 1, wherein the rotation sensor is initially in a low power state, and wherein the at least one processor is configured to:
    compute a variance based on the acceleration data from the accelerometer; and
    trigger the rotation sensor to transition from the low power state to an operational state in response to the computed variance.

11. The apparatus of claim 1, wherein the at least one processor is configured to:
    detect movement of the moveable platform, and
    in response to detecting the movement of the moveable platform, deactivate a determination of the open/close status of the barrier.

12. The apparatus of claim 1, wherein the at least one processor is part of the sensor device.

13. The apparatus of claim 12, wherein the sensor device is configured to allow a determination of the open/close status of the barrier without using any external wiring or accessory device outside the sensor device.

14. The apparatus of claim 1, wherein the sensor device further comprises a communication component to transmit an indication of the open/close status of the barrier over a network to a destination device.

15. A method of at least one processor, comprising:
receiving, from a rotation sensor, rotation data at a plurality of time points, the rotation sensor being part of a sensor device mounted to a barrier that is pivotable between an open position and a closed position, the barrier pivotably mounted to a frame on a moveable platform, the moveable platform moveable between different locations during operation of the moveable platform;
aggregating the rotation data at the plurality of time points to produce an aggregate value;
receiving acceleration data from an accelerometer;
learning a convergence value that differs for different orientations of the moveable platform;
determining, based on the aggregate value, whether the barrier has moved to the open position or the closed position, wherein the determining of whether the barrier has moved to the closed position is further based on convergence of the acceleration data based on the learned convergence value that is variable due to movement of the moveable platform; and
triggering an action in response to the determining that the barrier is in the open position or the closed position.

16. The method of claim 15, wherein the aggregate value represents an angle of rotation of the barrier.

17. The method of claim 15, wherein the determining comprises:
detecting that the barrier has moved to the open position in response to the aggregate value exceeding a first threshold.

18. The method of claim 17, wherein the determining comprises:
detecting that the barrier has moved to the closed position in response to the aggregate value being less than a second threshold, and a stationary indication value indicating that the barrier has become stationary.

19. The method of claim 17, further comprising:
detecting that the barrier has moved to the closed position in response to the aggregate value being less than a second threshold, and the acceleration data from the accelerometer having converged to a specified condition based on the convergence value that comprises stationary mean and variance values of the acceleration data.

20. A non-transitory machine-readable storage medium storing instructions that upon execution cause at least one processor to:
receive rotation data from a rotation sensor;
receive acceleration data from an accelerometer;
determine that a barrier mounted on a moveable platform is in an open position based on the rotation data indicating that the barrier has rotated by greater than a first threshold;
determine that the barrier is in a closed position based on the rotation data indicating that the barrier has rotated by less than a second threshold and the acceleration data converging to a specified value that is based on an orientation of the moveable platform, the specified value being different for different orientations of the moveable platform; and
trigger an action in response to the determining that the barrier is in the open position or the closed position.

21. The non-transitory machine-readable storage medium of claim 20, wherein the instructions upon execution cause the at least one processor to:
learn the specified value for a current orientation of the moveable platform, the learned specified value based on acceleration data.

* * * * *